US007618702B2

(12) United States Patent
Frey et al.

(10) Patent No.: US 7,618,702 B2
(45) Date of Patent: Nov. 17, 2009

(54) CELLULOSIC/POLYAMIDE COMPOSITE

(75) Inventors: Margaret W. Frey, Ithaca, NY (US); Lei Li, Ithaca, NY (US); Thomas B. Green, Liberty Township, OH (US)

(73) Assignee: Cornell Research Foundation, Inc., Ithaca, NY (US)

( * ) Notice: Subject to any disclaimer, the term of this patent is extended or adjusted under 35 U.S.C. 154(b) by 346 days.

(21) Appl. No.: 11/637,745

(22) Filed: Dec. 13, 2006

(65) Prior Publication Data

US 2007/0163217 A1    Jul. 19, 2007

Related U.S. Application Data

(60) Provisional application No. 60/759,040, filed on Jan. 17, 2006.

(51) Int. Cl.
B32B 27/04 (2006.01)

(52) U.S. Cl. ............... 428/297.4; 428/298.4; 428/300.4

(58) Field of Classification Search ............. 428/297.4, 428/298.4, 300.4; 442/340, 341
See application file for complete search history.

(56) References Cited

U.S. PATENT DOCUMENTS

| | | | |
|---|---|---|---|
| 3,565,979 A | 2/1971 | Palmer | |
| 4,043,331 A | 8/1977 | Martin et al. | |
| 4,143,196 A | 3/1979 | Simms et al. | |
| 4,650,506 A | 3/1987 | Barris et al. | |
| 4,759,782 A | 7/1988 | Miller et al. | |
| 4,764,424 A | 8/1988 | Ganga et al. | |
| 5,672,399 A | 9/1997 | Kahlbaugh et al. | |
| 6,743,273 B2 * | 6/2004 | Chung et al. | ................ 55/482 |
| 6,902,592 B2 | 6/2005 | Green et al. | |
| 6,924,028 B2 * | 8/2005 | Chung et al. | ................ 428/357 |
| 7,270,693 B2 * | 9/2007 | Chung et al. | ................ 55/528 |
| 7,390,760 B1 * | 6/2008 | Chen et al. | ................ 442/341 |
| 7,485,591 B2 * | 2/2009 | Frey et al. | ................ 442/340 |

OTHER PUBLICATIONS

Li, L., et al., "Modification of Air Filter Media With Nylon-6 Nanofibers", From the Mar. 2006 American Chemical Society (ACS) preprints booklet associated with ACS National Meeting in Atlanta, Georgia.

Li, L., et al., "Formation and properties of nylon-6 and nylon-6/montmorillonite Composite Nanofibers", Polymer 47 (2006), 6208-6217.

Reneker, D. H., "Nanometre diameter fibres of polymer, produced by electrospinning", Nanotechnology 7, 216-233 (1996), Abstract only.

Graham, K., et al., "Polymeric Nanofibers in Air Filtration Applications", presented at the Fifteenth Annual Technical Conference & Expo of the American Filtration & Separations Society, Galveston, Texas, Apr. 9-12, 2002.

Hegde, R.R., et al., "Nanofiber Nonwovens", updated December 23, 2004, http://www.engr.utk.edu/mse/pages/Textiles/Nanofiber%20Nonwovens.html.

Grafe, T., et al., "Polymeric Nanofibers and Nanofibers Webs: A New Class of Nonwovens", presented at INTC 2002: International Nonwovens Technical Conference (Joint INDA-TAPPI Conference), Atlanta, Georgia, Sep. 24-26, 2002.

\* cited by examiner

*Primary Examiner*—N. Edwards
(74) *Attorney, Agent, or Firm*—Bacon & Thomas, PLLC

(57) ABSTRACT

Composite of polyamide layer solvent bonded to cellulosic substrate is formed by solution electrospinning deposit of polyamide on cellulosic substrate with the solution subjected to electrospinning containing as solvent for polyamide one that swells cellulosic fibers on contact therewith and/or by depositing very long polyamide fibers of low average diameter.

5 Claims, 9 Drawing Sheets

CELLULOSIC/POLYAMIDE COMPOSITE

CROSS-REFERENCE TO RELATED APPLICATIONS

This application claims the benefit of U.S. Provisional Application No. 60/759,040, the whole of which is incorporated herein by reference.

TECHNICAL FIELD

This invention is directed to improving functionality of cellulosic structures.

BACKGROUND OF THE INVENTION

It has been posited that adhering of a polyamide layer to a cellulosic substrate will improve the functionality of the cellulosic substrate, e.g., improve the filtration efficiency of cellulosic filter media or strengthen a cellulosic substrate.

One method that may be considered for adhering the polyamide layer to the cellulosic substrate is by bonding the two together by use of an adhesive therebetween, i.e., a different substance therebetween that effects the adherence.

This method is unuseful for filtration functionality and involves an extraneous substance for all functionalities.

While solvent welding is known to bond soluble plastic to unlike porous surface, including wood and paper, through impregnation and encapsulation of fibers of the unlike porous surface, a problem is presented on how to effect this kind of bonding or variation thereof between a polyamide fiber layer and a cellulosic substrate layer in an operative manner and so that two layers cannot be separated by manually applied peeling forces.

SUMMARY OF THE INVENTION

It has been discovered herein that composite comprising a cellulosic substrate comprising cellulosic fibers with a polyamide layer comprising polyamide fibers adhered thereto by an interrelation of fibers of the cellulosic substrate and the polyamide layer and without an extraneous material (i.e., material this is not cellulosic or polyamide) therebetween so that the cellulosic substrate and polyamide layer cannot be separated from each other by manually applied peeling force(s), can be prepared by solution electrospinning deposit of polyamide fibers on moving cellulosic substrate and use of solvent in the solution electrospinning which swells cellulosic fibers of the cellulosic substrate during contact therewith.

One embodiment herein, denoted the first embodiment herein, is directed at a composite comprising a cellulosic substrate with a polyamide layer adhered thereto by an interrelation of fibers of the cellulosic substrate and fibers of the polyamide layer so that the cellulosic substrate and the polyamide layer cannot be separated from each other by manually applied peeling force(s). In one application, the composite constitutes a filter medium.

In another embodiment herein, denoted the second embodiment, the invention is directed to a composite constituting a filter medium comprising a cellulosic substrate comprising cellulosic fibers and having a caliper ranging from 0.010 inch to 0.020 inch and polyamide layer comprising polyamide fibers having average diameter ranging from 100 to 150 nm with the coverage level of the polyamide fibers on the cellulosic substrate being less than 0.1 gm/m², said medium providing a ratio of increase in percent fractional efficiency compared to that for the cellulosic substrate to percent increase in pressure drop across the medium compared to that for cellulosic substrate ranging from 3 to 15.

In another embodiment herein, denoted the third embodiment herein, the invention is directed at a method for preparing a filter medium comprising the steps of (a) dissolving polyamide in a solvent which swells cellulosic fibers during contact therewith, to form a polyamide solution; (b) moving the solution to a droplet forming zone; (c) forming droplets of the solution in the droplet forming zone; (d) providing an electric charge on the droplets to form jets of polyamide solution and provide unstable flow involving a plurality of electrically induced bending instabilities/whipping motions and flashing off of solvent and production of and elongation of polyamide fibers; (e) and collecting the polyamide fibers on a surface of a moving substrate layer comprising cellulosic fibers to adhere a layer of polyamide fibers to substrate layer so as to prevent peeling apart of polyamide fiber layer and substrate layer.

The term "cellulosic" is used herein to mean composed of or derived from cellulose and includes wood, paper, wood fibers (cellulose), cotton (cellulose), cellulose films, rayon (regenerated cellulose), acetate (cellulose acetate), and triacetate (cellulose triacetate) and may include up to 30% by weight polyester fibers.

The term "polyamide" is used herein to mean polymer in which amide linkages (CONH) occur along the molecular chain and include nylons, including nylon-6, which is H—[NH(CH$_2$)$_5$CO—]$_n$OH.

DETAILED DESCRIPTION

Figure 1:
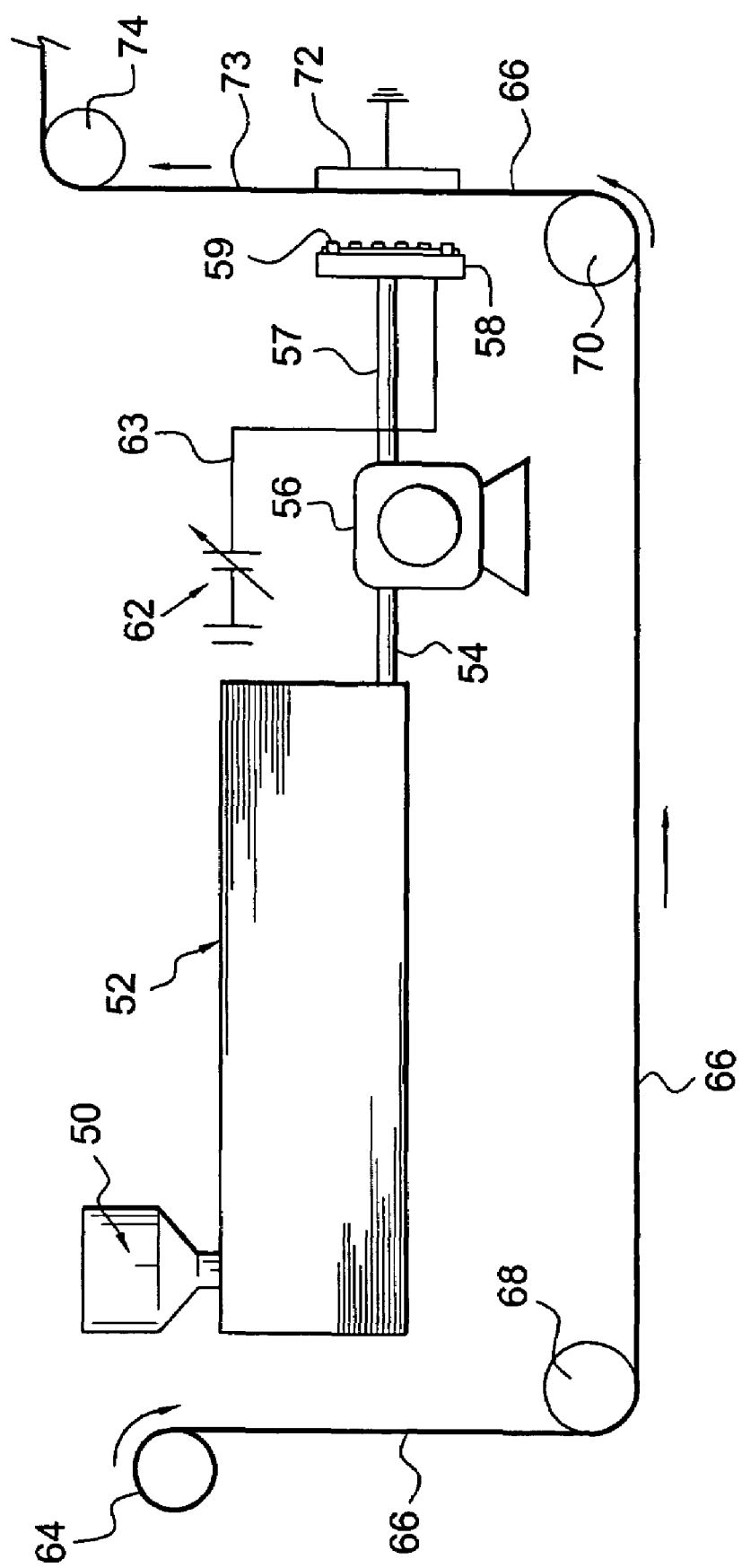
FIG. 1 is a schematic diagram of apparatus and method described in Working Example I.

We turn now to the first embodiment herein.

Preferably the cellulosic substrate has a caliper ranging from 0.010 inch to 0.020 inch and the polyamide fibers have an average fiber diameter ranging from 50 to 700 nm, e.g., 100 nm to 400 nm, a coverage level to average diameter ratio ranging from $2\times10^{-4}$ to $5\times10^{-3}$ gms/m$^2$/nm and a ratio of total length of polyamide fibers to the surface area of the cellulosic substrate ranging from $1\times10^6$ to $1\times10^8$ km polyamide fiber/ square meter of cellulosic substrate surface area.

As indicated above, the polyamide layer and the cellulosic substrate are adhered by an interrelation of fibers of the polyamide layer and fibers of the cellulosic substrate so that the polyamide layer and the cellulosic substrate cannot be separated from each other by manually applied peeling force(s). This is obtained by softening and swelling of polyamide fibers and swelling of cellulosic fibers with solvent for polyamide which effects this and facilitates contact between the two kinds of fibers and contacting softened swelled polyamide fibers and swelled cellulosic fibers, followed by evaporation of solvent, to provide solvent bonding, also called solvent welding, between the two layers. For maximum peelability resistance, the coverage level of polyamide fibers on cellulosic substrate should be 0.2 g/m$^2$ or lower, preferably 0.1 g/m$^2$ or lower (e.g., down to 0.01 g/m$^2$).

The composite can be made by solution electrospinning of polyamide fiber onto a moving web of substrate layer comprising cellulosic fibers and then evaporating any residual solvent. The solvent used is a solvent for polyamide preferably at room temperature which causes cellulosic fibers to swell during contact therewith.

The third embodiment herein is directed to a method of preparing composite of the first embodiment which is filter medium.

The composite of the first embodiment finds application for filter medium for air, fuel and lubricating fluid, for example, for automobiles, trucks, heavy equipment, rail propulsion and hydraulic systems, airplane propulsion and hydraulic systems, HVAC, furnaces, industrial air pollution control, room and dwelling air cleaners; and personal safety devices. Other applications include, stronger, or reinforced cellulosic sheets; to allow detection of alterations or duplications or to allow determination of authenticity of cellulose-based documents or currency; to provide a sensing layer on a cellulose layer by associating the polyamide layer with a sensing layer biosensor, e.g., biotin bound to biosensing molecule as described in U.S. application Ser. No. 11/417,188, the whole of which is incorporated herein by reference; to provide a polyamide layer into or on which antibacterial or other therapeutic agent is incorporated, on cellulosic substrate, e.g., on cotton gauze or a cotton or other cellulosic bandage; or to provide a decorated cellulosic sheet.

We turn now to the case where the composition is a filter medium. The cellulosic substrate constitutes cellulosic fibers and has a basis weight ranging from 50 to 75 lbs/3000 ft$^2$, a Frazier permeability ranging from 12 to 20 CFM measured at 0.5 inch of water pressure drop and an initial fractional efficiency ranging from 5 to 15% for 0.3 μm particles. The cellulosic substrate can be pleated or fluted.

In the case of the cellulosic substrate used in experiments in support of the invention herein, the cellulosic substrate was filter grade and was constituted of cellulose made up of softwood and hardwood fiber systems and 20% by weight polyester fibers and had a caliper of 0.016 inch, a basis weight of 65 lbs/3000 ft$^2$ and a Frazier permeability of 16 CFM measured at 0.5 inch water pressure drop and an initial fractional efficiency of 10% for 0.3 μm particles. The material for the cellulosic substrate was obtained from Clarcor, Inc. (Franklin, Tenn.).

The term "initial fractional efficiency" refers to the efficiency of a clean filter, i.e., what fraction of particles a clean filter removes. "Initial" is important because once the filter develops a cake of particles, the particles themselves improve the filtration efficiency and also increase pressure drop.

Polyamide fiber diameters obtained were 120 nm, 300 nm, and 700 nm, i.e., ranged from 120 nm to 700 nm. Coverage levels of polyamide fiber layer on cellulosic substrate were 0.03, 0.06, 0.1 and 0.5 gm/m$^2$, i.e., ranged from 0.03 to 0.5 gm/m$^2$.

Polyamide fiber lengths obtained ranged from $3.97\times10^2$ km to $4.13\times10^4$ km.

More detailed data is presented in Working Example II below and in Li, Frey and Green cited below.

The benefit obtained by the addition of the polyamide layer herein is increase in efficiency without a large increase in pressure drop.

The composite medium provides a ratio of increase in percent fractional efficiency compared to that of the cellulose substrate, to percent increase in pressure drop across the medium compared to that for the cellulosic substrate, ranging from 3 to 15.

Thus, the context of the above for a filter medium is as follows: Composite filter medium of the first embodiment herein has an inlet side and an outlet side (unfiltered fluid inlet and filtered fluid outlet) and comprises: (a) substrate layer on the outlet side of the medium, said substrate layer having an inlet side and an outlet side, said substrate layer comprising cellulosic fibers, and having a caliper ranging from 0.010 inch to 0.020 inch, a basis weight ranging from 50 to 75 lbs/3000 ft$^2$, a Frazier permeability ranging from 12 to 20 CFM measured at 0.5 inch of water pressure drop and an initial fractional efficiency ranging from 5 to 15% for 0.3 μm particles; and (b) polyamide layer having an inlet side and an outlet side, comprising polyamide fibers and having an average fiber diameter ranging from 50 to 700 nm, preferably 100 to 400 nm, a coverage level to average diameter ratio ranging from $2\times10^{-4}$ to $5\times10^{-3}$ gms/m$^2$/nm and a ratio of total length of polyamide fibers to the surface area of the cellulosic substrates ranging from $1\times10^6$ to $1\times10^8$ km polyamide fiber/ square meter of cellulosic substrate surface area; said substrate layer being adhered at its inlet side to the outlet side of the polyamide layer by an interrelation of fibers of the substrate layer and the polyamide layer so that the cellulosic layer and polyamide layer cannot be separated from each other by manually applied peeling force(s); said media providing a ratio of increase in percent fractional efficiency compared to that for substrate (a) to increase in percent pressure drop across medium compared to that for substrate (a) ranging from 3 to 15. Polyamide fiber length range, for example, from $3.5\times10^2$ km to $4.5\times10^4$ km. Coverage levels of polyamide fibers on cellulosic substrate layer can range, for example, from 0.01 to 0.2 gm/m$^2$. Preferably, there is no cover layer on the polyamide layer inlet side.

The residual solvent of the electrospinning solution dissolves or softens and swells the polyamide fibers formed and deposited on the cellulosic substrate (layer) and on contact with the substrate layer swells cellulosic fibers and facilitates contact between polyamide fibers and cellulosic fibers (swelling of the cellulosic fibers means the areas of contact with polyamide fibers will be larger) and evaporation of said solvent causes bonding of the polyamide and cellulosic layers.

We turn now to the second embodiment of the invention herein, wherein the polyamide fiber length is at least $3.5\times10^2$ km and can range, for example, up to $4.5 \times 10^4$ km. In preferred cases, the coverage level of polyamide fibers on cellulosic substrate ranges from 0.01 to 0.08 g/m², for example is 0.06 g/m² or 0.03 g/m².

The polyamide layer can be formed and adhered to the cellulosic substrate by solution electrospinning of polyamide fiber onto a moving web of substrate layer comprising cellulosic fibers and then evaporating any residual solvent (the solvent used is one which causes cellulosic fibers to swell during contact therewith) to solvent bond polyamide layer to cellulosic substrate layer.

Another method of forming polyamide layer is by solution electrospinning polyamide fibers onto a moving web of cellulosic substrate using a solvent which does not sufficiently swell the cellulosic fibers for solvent bonding sufficient for the layers not to be separatable from each other by manually applied peeling forces, or by melt electrospinning of polyamide fibers on a moving web of cellulosic substrate or by wet, dry or melt spinning of polyamide fiber onto cellulosic substrate, where the cellulosic substrate is pretreated (i.e., before polyamide fiber deposit) with dots or areas of adhesive to provide adherence without significantly interfering with initial filtration efficiency and without providing pressure drop across the medium more than one and one-half times that of the solvent bonding method.

In one case, there is provided a filter medium composition comprising polyamide fiber layer on cellulosic substrate layer, where the substrate layer has a caliper ranging from 0.010 inch to 0.020 inch, where the polyamide fibers have average diameter ranging from 100 to 150 nm, a fiber coverage less than 0.1 g/m² and a fiber length of at lest 350 km, where the layers are adhered to each other by solvent bonding so that the layers cannot be peeled apart by manually applied peeling forces, said medium providing a ratio of increase in percent fractional efficiency compared to that for the cellulosic substrate to percent increase in pressure drop across the medium compared to that for the cellulosic substrate ranging from 3 to 15.

We turn now to the third embodiment of the invention herein.

We turn to the solvents for use in dissolving polyamide. The solvent should be one that not only dissolves polyamide, preferably at room temperature, but also one that causes cellulosic fibers to swell, e.g., from 10 to 25%. Swelling percentage is determined by measuring diameters of 20 to 40 of the cellulosic fibers before and after immersion is solvent for about twenty minutes using Scion Image Software. Where the fibers have irregular morphology, fiber diameter is measured at the thickest parts of the fibers.

The solvent used in experiments supporting the invention was 88% formic acid (i.e., aqueous formic acid containing 88% formic acid). Dissolution of nylon-6 in 88% formic acid was obtained at room temperature by gently stirring for 8 hours. Another useful solvent is a glacial acetic acid.

With the setup used for experiments supporting the invention, nylon-6 was used as the polyamide and nylon-6 concentrations in solution in 88% formic acid tried were 15%, 20%, 25% and 30% (w/w). Electrospinning of nylon-6 solutions of 20 and 25% concentration could be sustained for several hours with a nozzle opening of 0.4 mm inner diameter and a feed rate of 0.1 ml/hr per nozzle. Electrospinning of solution of nylon-6 in 88% formic acid at the 30% level was interrupted every few minutes due to high solution viscosity. At 15% nylon-6 concentration, a large amount of beaded structures were observed, i.e., fibers were not the main product.

The droplet forming zone was provided by nozzles. Solution feed rates with a nozzle of 0.4 mm inner diameter tried in experimentation supporting the invention were 0.1 ml/hr per nozzle, 0.3 ml/hr per nozzle and 0.5 ml/hr per nozzle. At 0.3 ml/hr, solution droplets blew away from the nozzles periodically. At 0.5 ml/hr solution started to drip from the nozzle tip. Accommodation for the feed rate was made by multijet electrospinning, i.e., by using a nozzle bank.

Varying the nozzle tip-to-collector distance from 7 to 14 cm did not result in any observable effects on fiber size and morphology.

The electric charge on the droplets was provided by applying a voltage to the nozzles of the droplet forming zones. The voltage can be varied, for example, from 5 to 50. The voltage used in experiments to support the invention was 29 kV.

Elements of the invention and working examples are provided in (1) an online publication, Li, L., Frey, M. W. and Green, T. H., Journal of Engineered Fibers and Fabrics, Volume 1, Issue 1, pages 1-22, http://www.jeffjournal.org/papers/06Aug_AirFilterMedia.pdf, first appearing in September 2006; and (2) a preprint from the March 2006 American Society (ACS) preprints booklet associated with a presentation given at the ACS 2006 national meeting in Atlanta, Ga.

The invention and means for providing it are illustrated in the following working examples.

Working Example I

Apparatus for use in carrying out the second embodiment herein is depicted in FIG. 1. With continuing reference to FIG. 1, there is depicted a hopper 50, a fluid reservoir 52, a pipe 54, a pump 56, a pipe 57, a header 58 and nozzles 59. Polyamide solution is added into hopper 50 from where it flows to reservoir 52. Polyamide solution is pumped by pump 56 via pipe 54 into pipe 57 and from pipe 57 enters header 58 and is moved through and out of nozzles 59 at a selected rate to provide droplets of polyamide solution emitting from the droplet forming zone of the nozzles. The header 58 and nozzle 59 are electrically charged by voltage supplier 62 via electrical conductor 63. Apparatus for feeding cellulosic web is constituted by a feed role 64 which feeds a cellulosic web 66 via guide rolls 68 and 70 past nozzles 59. The electric charge on header 58 and nozzles 59 provides an electric charge on the droplets emitting from nozzles 59 to form jets of polyamide solution and provide unstable flow involving a plurality of electrically induced bending instabilities/whipping motions and flashing off of solvent and production of and elongation of polyamide fibers which are collected on web 66. A grounded conductor 72 facilitates the deposit of the web 66 constituting moving cellulosic substrate layer. Residual solvent causes dissolving or softening and swelling of deposited polyamide fibers and swelling of cellulosic fibers. Evaporation of residual solvent then spontaneously occurs to cause bonding of cellulosic substrate layer and polyamide layer so that the layers cannot be peeled apart by manually applied peeling force(s). The formed composite 73 is collected via take-up roll 74.

Working Example II

Instead of a reservoir and pump as described for Working Example I, nylon-6 solution in 88% formic acid was fed using a syringe pump (Model 100 kdScientific) and delivered to a nozzle bank of 13 nozzles at the same time. Each nozzle had a 0.4 mm inner diameter. All the nozzles were located one inch on center and the spacing from nozzle to nozzle was the same.

Cellulosic web was filter grade and made up of soft wood and hard wood fiber systems and 20% polyester fiber and had caliper of 0.016 inch, basis weight of 65 lbs/300 ft² and a Frazier permeability of 16 CFM measured at 0.5 inch water pressure drop and an initial fractional efficiency of 10% for 0.3 µm particles, and was obtained from Clarcor, Inc. of Franklin, Tenn.

The cellulosic web was continuously moved past the nozzle tips. A drive to move the web is a vector duty motor powered by a 230 V/3 PH/15 A power source operatively connected to a 500.1 ratio gear reducer providing a continuous speed range of 1 to 40 inches per minute controlled by an Allen Bradley PowerFlex 700 controller with a size 25 incremental encoder.

The cellulosic web was backed by a grounded aluminum plate to attract nylon-fibers to the cellulosic web, in the area of desired coverage.

A high voltage power supply (Gamma High Voltage Supply, ES30-0.1P) supplied an electrospinning voltage of about 29 kV to the nozzle bank.

Nozzle tip-to-collector distance was varied from 7 to 14 cm.

Solution concentration was varied from 15% to 30% w/w. The solution properties and obtained electrospun nylon-6 fiber diameters are given in Table 1 below.

TABLE 1

| Concentration (wt %) | Viscosity (Pa * s) | Conductivity (mS/cm) | Surface Tension (mN/m) | Fiber Size (nm) |
|---|---|---|---|---|
| 15 | 0.5 | 4.62 | 41.21 | — |
| 20 | 1.5 | 4.30 | 42.33 | 120 |
| 25 | 2.4 | 3.55 | 42.57 | 300 |
| 30 | 8.7 | 2.90 | 41.44 | 700 |

At 15% w/w a large amount of nylon-6 beaded structures were obtained rather than nylon-6 fibers. Fibers became the main product when the solution was increased to 20% or higher. Average diameter of nylon-6 fibers increase from 120 nm to 300 nm to 700 nm at solution concentration increased from 20% to 25% to 30%.

Feed rates of 0.1 ml/hr per nozzle, 0.3 ml/hr per nozzle and 0.5 ml/hr per nozzle were tried. At a feed rate of 0.3 ml/hr per nozzle, solution droplets blew away from the nozzle tips periodically. At 0.5 ml/hr per nozzle solution started to drip from the nozzle tip. Thus 0.1 ml/hr per nozzle feed rate was chosen to collect data.

At the feed rate of 0.1 ml/hr per nozzle the electrospinning of nylon-6 solution with a concentration of 25% or lower could be sustained for several hours; on the other hand, at 30% concentration, electrospinning was interrupted every few minutes due to the high solution viscosity (so 700 nm diameter fibers obtained by use of 30% concentration were not a practical course). Since fibers with diameters smaller than 500 nm are expected to favor higher filtration efficiency due a the slip-flow mechanism at the filter surface, solution concentration of 20% w/w and 25% w/w at the 0.1 ml/hr per nozzle feed rate were used and electrospinning was carried out on the apparatus as described above in this example using these conditions to collect data.

Varying the nozzle tip-to-collector distance from 7 to 14 cm did not result in any observable difference in respect to fiber size and morphology. A nozzle tip-to-collector distance of 14 cm was selected to collect data.

The volume of nylon-6 solution needed to achieve a selected coverage level is calculated by the following formula:

$$V = \frac{CA \times CL}{C \times d}$$

when V is volume in ml, CA and CL are the coverage area (m²) and coverage level (g/m²) respectively and C and d are the concentration and density of nylon solution, which were 0.2 and 1.20 g/ml, respectively. The motor speed providing cellulosic web speed to obtain the coverage level at the solution feed rate is calculated by $$MS = \frac{L}{\frac{V \times 60(\text{min/hr})}{r}}$$

when MS stands for motor speed, L is the length of air filter media (m), r is the solution feeding rate (ml/hr) and L was calculated by dividing the coverage area with the width of the air filter media, 0.3 m.

Coverage levels of 0.03 g/m², 0.06 g/m², 0.1 g/m² and 0.5 g/m² were provided by using electrospinning conditions and apparatus as described above in this example to provide in one case deposit of 120 nm fibers (20% electrospinning solution) and in another case 300 nm diameter fibers (25% electrospinning solution).

To summarize what was done, 20% nylon-6 in 88% formic acid and 25% nylon-6 in 88% formic acid were fed using the syringe pump described above to the nozzle bank described above charged by about 29 kV to obtain solution electrospinning formation and deposit on cellulosic moving web 14 cm from the nozzle tips in one case a layer of 120 nm average diameter fibers and in another case a layer of 300 nm average diameter fibers.

Nylon-6 fiber length calculated as a function of fiber diameter and loading based on a density of amorphous nylon-6 of 1.07 g/cm² and assuming cylindrical fibers, are given in Table 2 below where RE+n means R×10ⁿ where n is a number 02, 03, 04:

TABLE 2

| grams nylon 6/ square meter | fiber diameter (nm) | fiber volume (cc) | fiber length (cm) | fiber length (km) |
|---|---|---|---|---|
| 0.03 | 120 | 0.0280 | 2.48E+08 | 2.48E+03 |
| 0.06 | 120 | 0.0561 | 4.96E+08 | 4.96E+03 |
| 0.1 | 120 | 0.0935 | 8.26E+08 | 8.26E+03 |
| 0.5 | 120 | 0.4673 | 4.13E+09 | 4.13E+04 |
| 0.03 | 300 | 0.0280 | 3.97E+07 | 3.97E+02 |
| 0.05 | 300 | 0.0467 | 6.61E+07 | 6.61E+02 |
| 0.1 | 300 | 0.0935 | 1.32E+08 | 1.32E+03 |
| 0.5 | 300 | 0.4673 | 6.61E+08 | 6.61E+03 |

Each nylon-6 layer deposited on cellulose substrate was solvent bonded to cellulosic substrate to form a composite air filtration medium and at coverage levels of 0.1 g/m² and lower the nylon-6 layer and cellulosic substrate could not be separated from each other by manually applied peeling forces.

Figure 3:
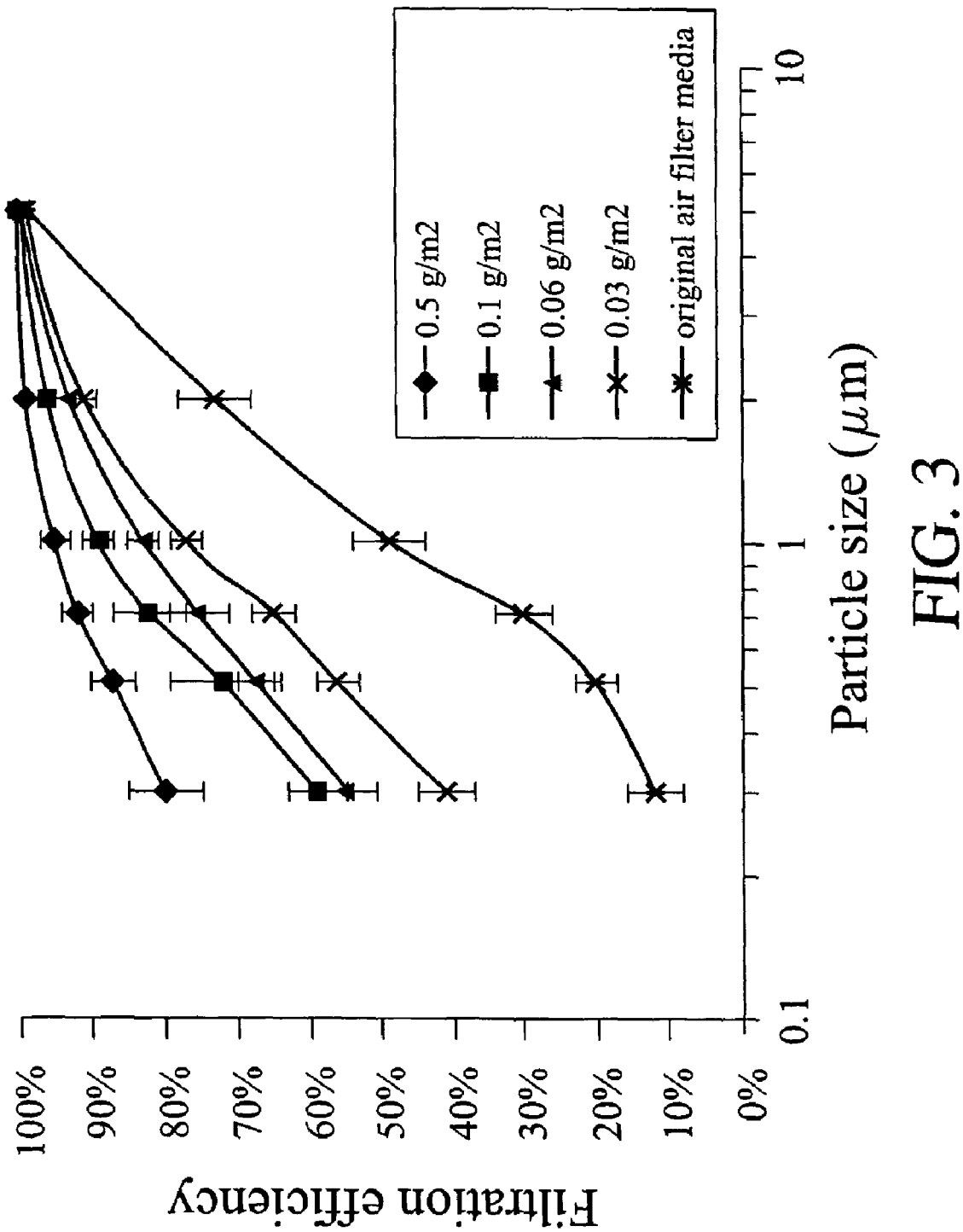
FIG. 3 is a graph of filtration efficiency of air filter media coated with electrospun nylon-6 fiber with average diameter of 120 nm at different coverage levels versus dust particle size of dust particles pulled into a tester and shows results of Working Example II.
Figure 4:
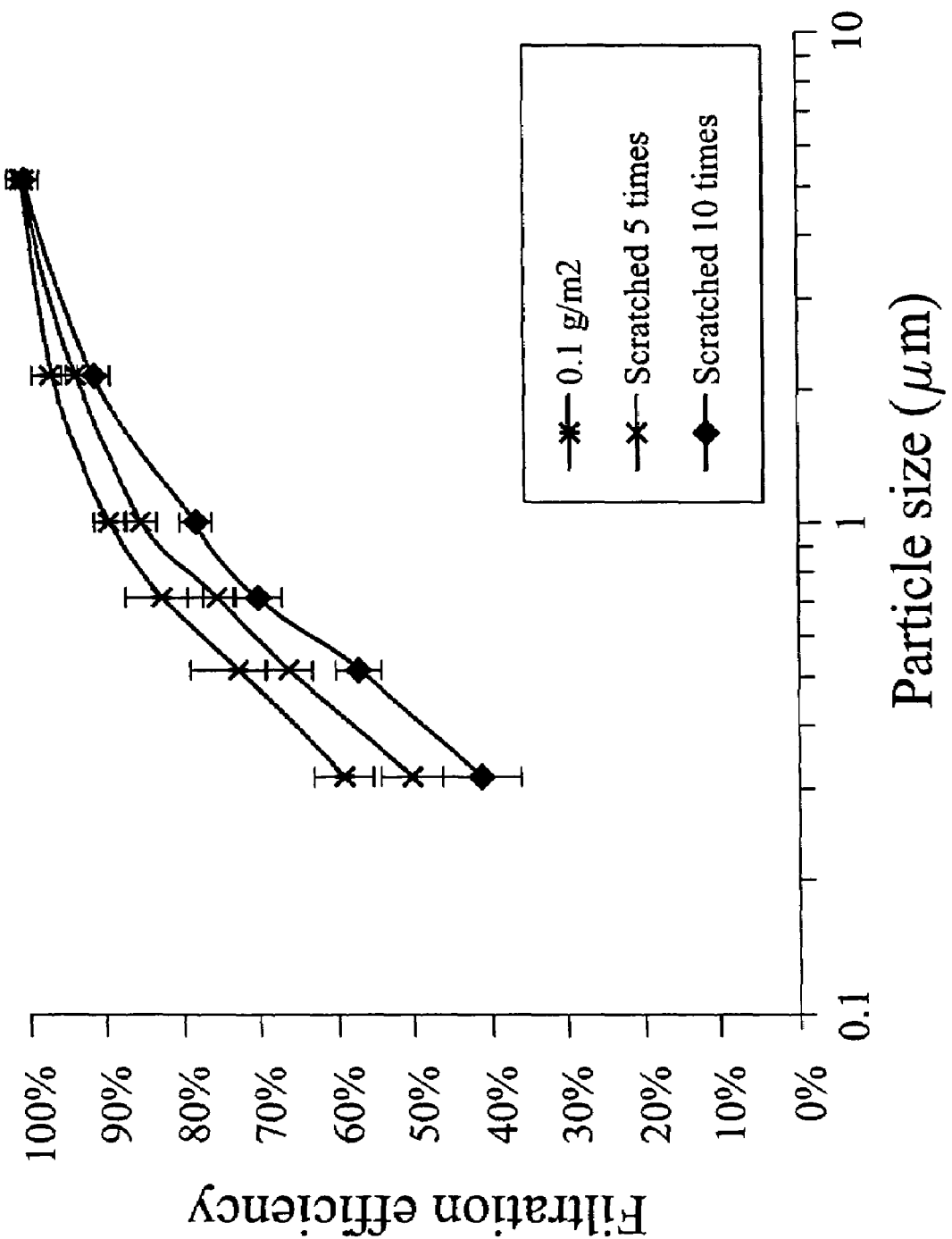
FIG. 4 is a graph of filtration efficiency of air filter media coated with electrospun nylon-6 fiber with average diameter of 120 nm at coverage level of 0.1 g/m² with and without scratching of the nylon-6 fiber coating and shows results of Working Example II.
Figure 5:
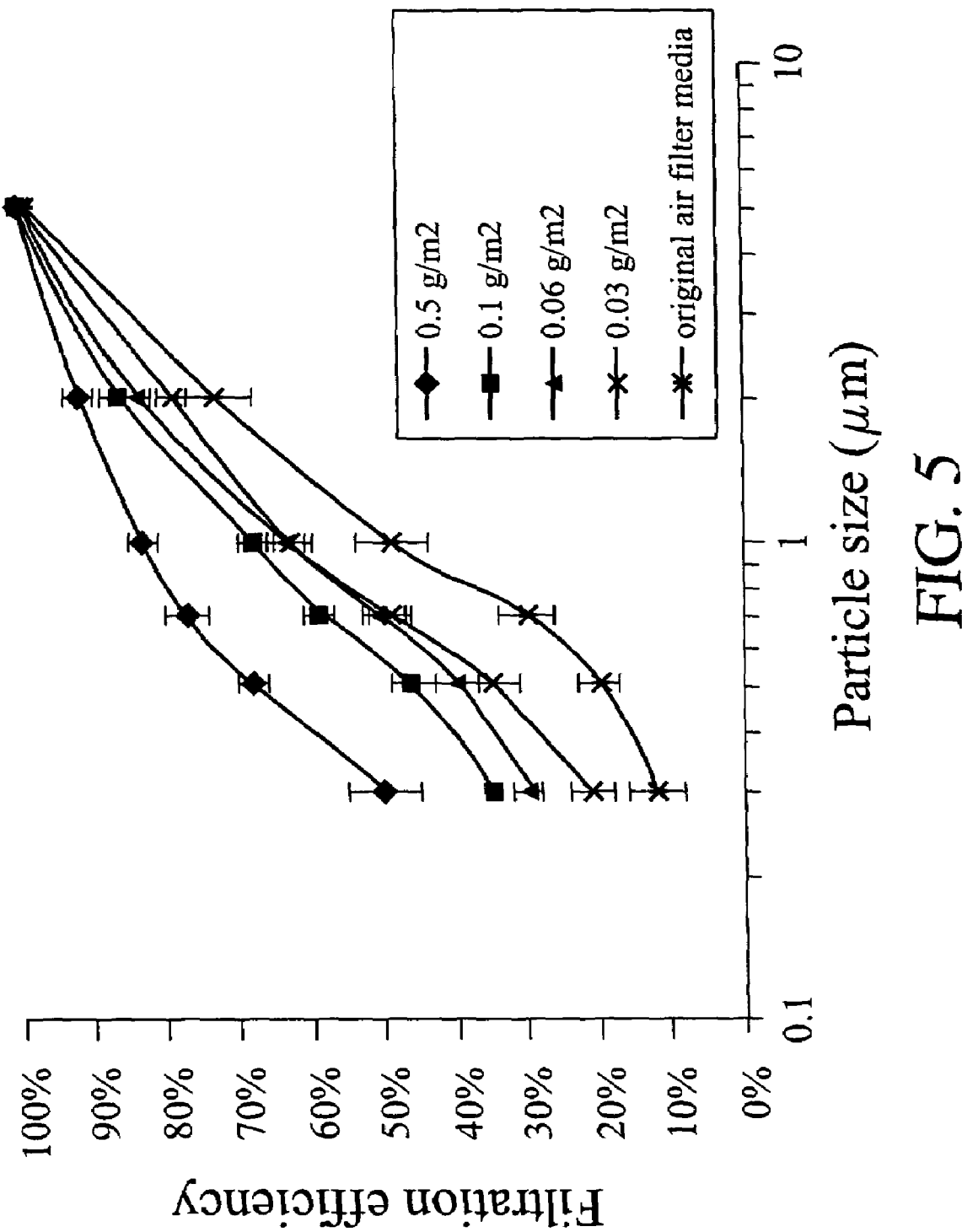
FIG. 5 is a graph of filtration efficiency of air filter media coated with electrospun nylon-6 fiber with average diameter of 300 nm at different coverage levels versus dust particle size of dust particles pulled into a tester and shows results of Working Example II.
Figure 6:
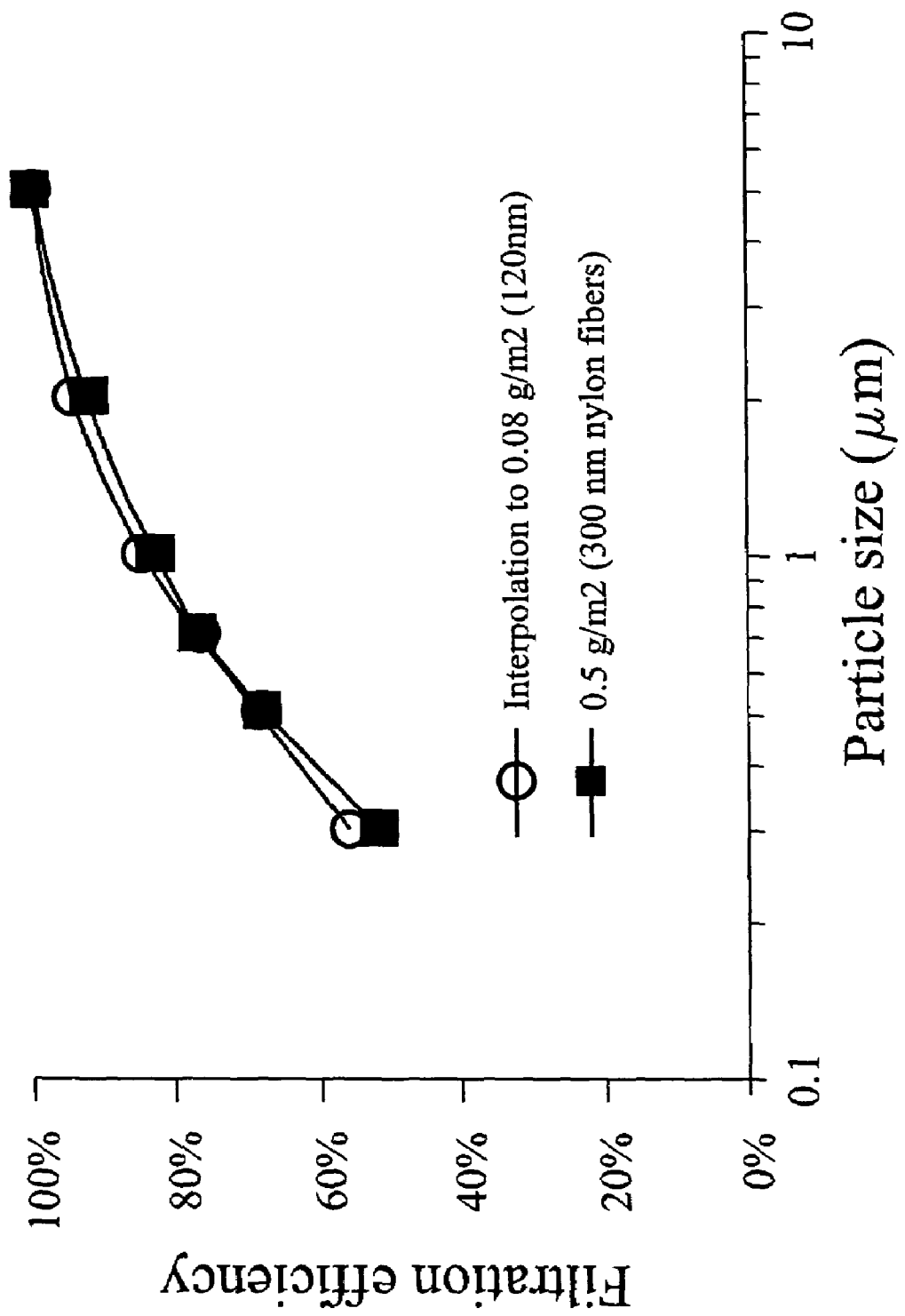
FIG. 6 is a graph of filtration efficiency of air filter media coated with electrospun nylon-6 fibers with different fiber diameter at similar fiber lengths and shows results of Working Example II.

Initial fractional efficiencies of the cellulosic substrate and composites produced by electrospinning polyamide fibers onto cellulosic substrate as described above were measured using a flat-sheet tester (United Air Specialists, Inc.). Dust particles with average sizes of 0.3 µm, 0.5 µm, 0.7 µm, 1 µm, 2 µm and 5 µm were in individual tests for each particle size, pulled into the tester at an air face velocity of 10 ft/min and counted both at upstream and downstream of the air filter medium using a laser particle counter. Data is shown in FIGS. 3, 5 and 6. As shown in FIG. 4, the filtration efficiency at a coverage level of 0.1 g/m² was still very high even though the nylon-6 layer was scratched 5 and 10 times.

Figure 2:
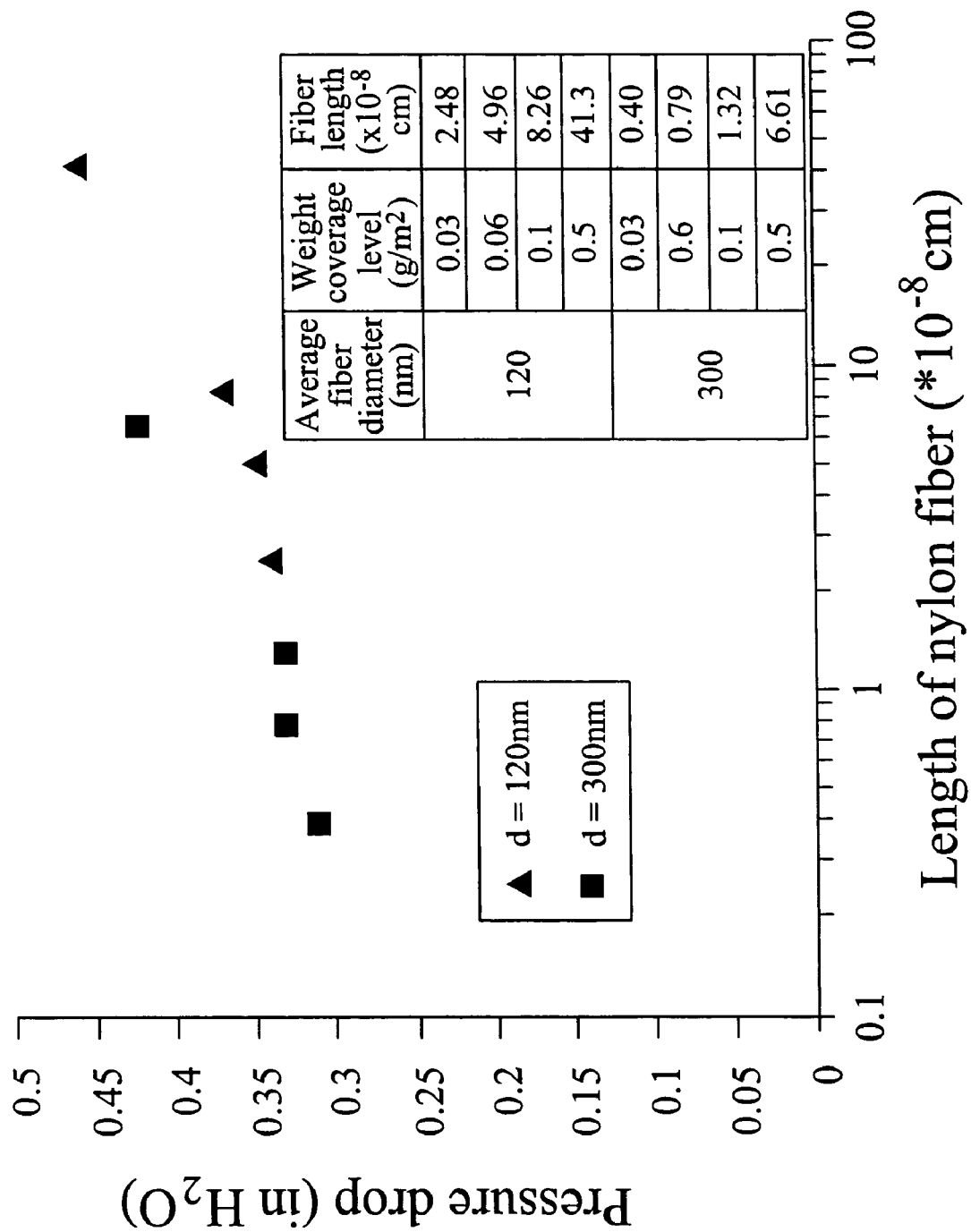
FIG. 2 is a graph of pressure drop versus length of nylon fiber and shows results of Working Example II.

Data for pressure drops across the composite filter (measured by using a Dwyer series 477a digital manometer) versus length of nylon-6 120 nm average diameter fibers and 300 nm average diameter fibers, is shown in FIG. 2. The parameter of the X-axis is the fiber length calculated from average mass loading, density and diameter of nylon-6 electrospun filaments. The parameter of the Y-axis is the measured pressure drop across the composite filter medium.

The data points on each curve of FIG. 2 respectively correspond to 0.03 g/m², 0.06 g/m², 0.1 g/m² and 0.5 g/m² loading. As shown in FIG. 2, at a loading of 0.1 g/m² and below there is a length dependent curve with small pressure drop increase as fiber length increases.

The pressure drop in inches of water for cellulosic media and composite with loading of 0.03, 0.06, 0.1 and 0.5 g/m², respectively were found to be 0.32, 0.34, 0.35, 0.37 and 0.46 inches of water; in other words, consistent with the length data of FIG. 2, there were only small pressure drop increases at loadings of 0.1 g/m² and below.

Thus the data shows a benefit in efficiency without large increase in pressure drop. At 0.1 g/m² coverage with 120 nm nylon-6 fibers, there was increase in initial fractional efficiency of approximately 50% for 0.3 μm particles compared to that for cellulosic substrate with only a 16% increase in pressure drop compared to that for cellulose substrate and a more robust filter (a ratio of increase in percent fractional efficiency compared to that for cellulosic substrate to percent increase in pressure drop across the medium compared to that for cellulosic substrate of 50÷16 or 3.33:1). At 0.03 g/m³ coverage with 120 nm nylon-6 fibers there was approximately a 30% increase in initial fractional efficiency compared to that for cellulosic substrate with only a 6% increase in pressure drop. (a ratio of increase in percent fractional efficiency compared to that for cellulosic substrate to percent increase in pressure drop across the medium compared to that for cellulosic substrate of 30÷6 or 5:1. Corresponding ratios for 300 nm fibers were 40÷3 or 10.3:1 for 0.1 g/m² coverage and higher for 0.03 g/m² coverage.

As indicated above, efficiency appears to correlate with coverage and pressure drop appears to correlate with fiber length.

For porosity measurements, the air filter media was completely saturated with a liquid with very low surface tension so that all the pores of the air filter media were covered by the liquid. When the applied air pressure exceeds the capillary attraction of the liquid in the pores, air passes through the sample. Smaller pores have a higher capillary attraction than larger pores and thus smaller pores open up at high pressures. Bubble point is the point when the largest pore is opened up by the air. So the bubble point pore diameter is the largest pore diameter of the sample. The porosity of air filter medias determined before and after coating with electrospun nylon-6 nanofibers is summarized in Table 3 below.

TABLE 3

| Sample | Mean pore diameter (μm) | Fraction of pores at mode size, (%) | Diameter of mode size (μm) | Bubble point pore diameter (μm) |
|---|---|---|---|---|
| Original air filter | 11.1 | 4.6 | 9.3 | 31.4 |
| Air filter media coated at 0.1 g/m² | 8.3 | 13.9 | 2.1 | 30.1 |

As shown in Table 3, the original air filter media exhibited larger mean pore size, 11.1 μm, which decreased to about 8.3 μm for the air filter media coated with electrospun nylon-6 nanofibers at the coverage level of 0.1 g/m². The coated air filter media also showed significantly larger amount of small pores, i.e. about 13.9% of pores were around 2.1 μm. in diameter, which is much smaller than those of the original air filter media. On the other hand, the bubble point pore diameter or the largest pore diameter was very similar, around 31 μm, for both types of air filter media, which indicates that the air filter media was only coated very lightly at the weight coverage level of 0.1 g/m².

Figure 8:
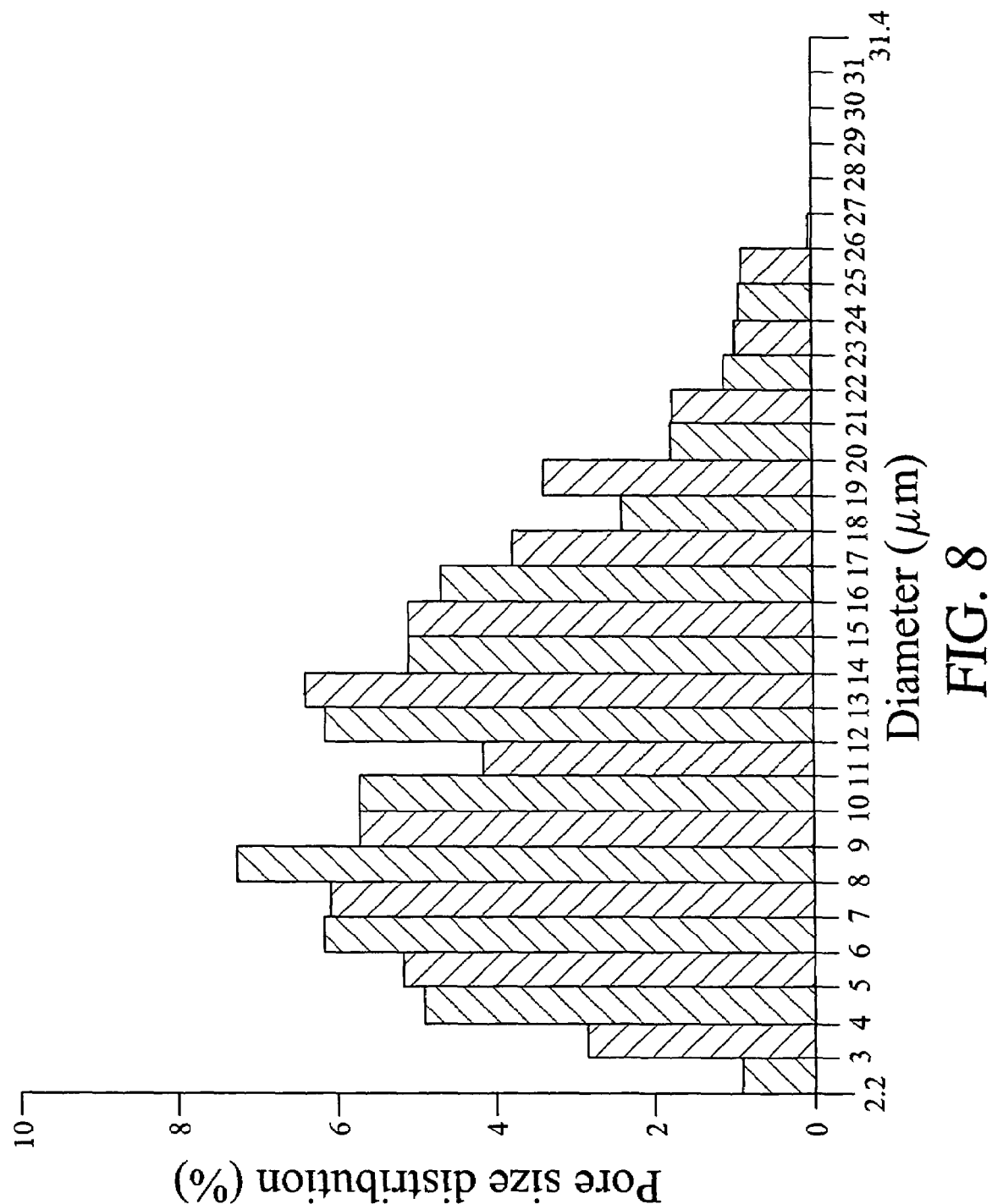
FIG. 8 is a bar graph of pore size distribution of uncoated air filter media and shows results for conventional air filter media for comparison purposes and shows results of Working Example II.
Figure 9:
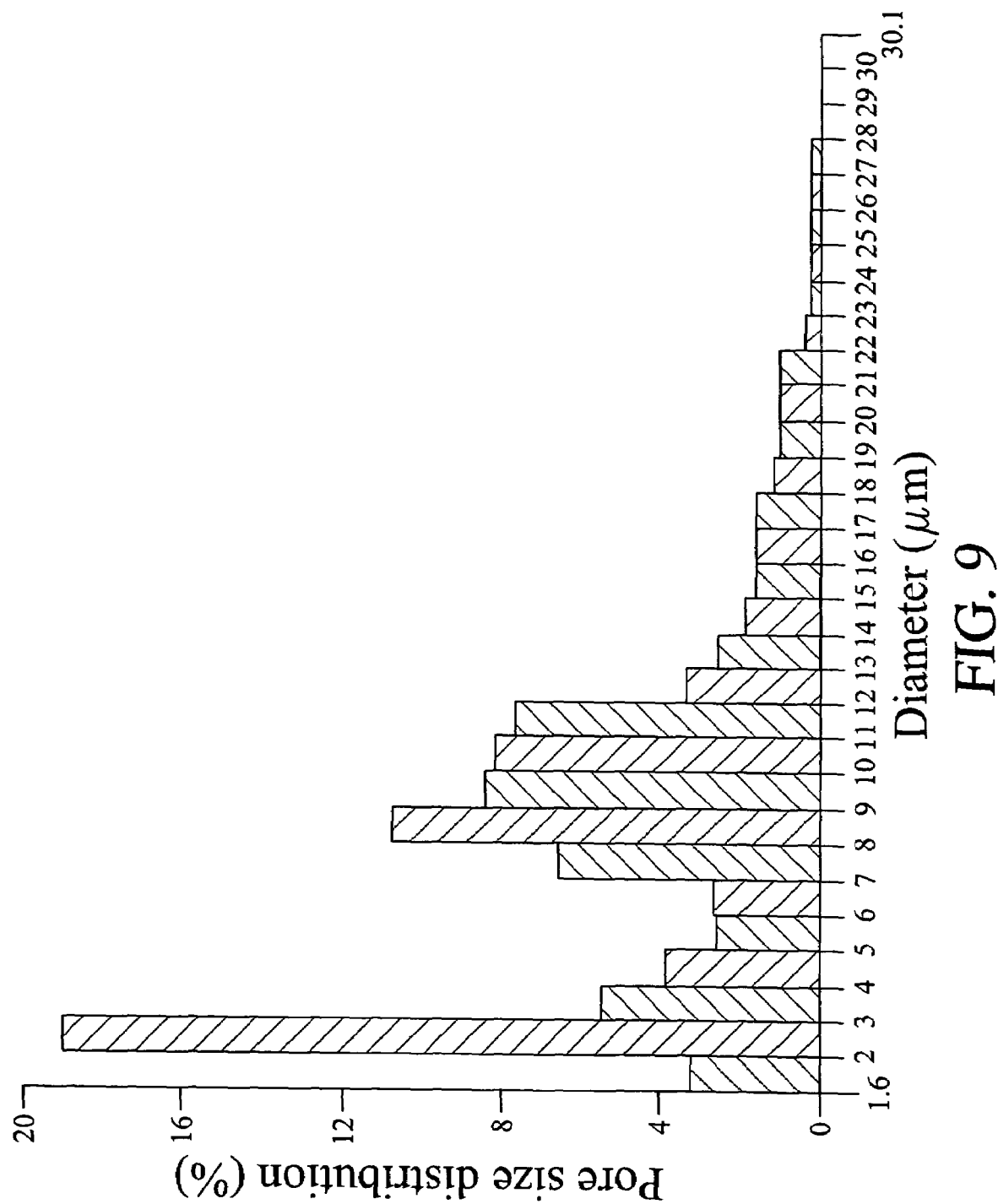
FIG. 9 is a bar graph of pore size distribution of air filter media coated with 120 nm nylon-6 electrospun fibers, at a weight coverage level of 0.1 g/m².

Pore size distribution of uncoated air filter, i.e., conventional air filter media, is shown in FIG. 8. Pore size distribution of air filter media coated with 120 nm nylon-6 electrospun filter, at a weight coverage of 0.1 g/m², is shown in FIG. 9. The pore size data shows there were almost no pores as small as the smallest particles being captured in the media so the improvement in filtration efficiency was not a result of creating physical barriers sieving out the particles. Since most of the particles tested were smaller than the inter-fiber pores of the air filter media, the single fiber mechanism as described in Chase, C. G., et al., Fluid/Particle Separation Journal 16 (2), 105-117 (2004) is the dominant capture mechanism for the improved initial fractional efficiency of the coated air filter media of the second embodiment herein. Instead of permeability measurement on a sample about 2 cm square pressure drop was determined on a sample 10 inches square. Results are shown in FIG. 2.

Figure 7:
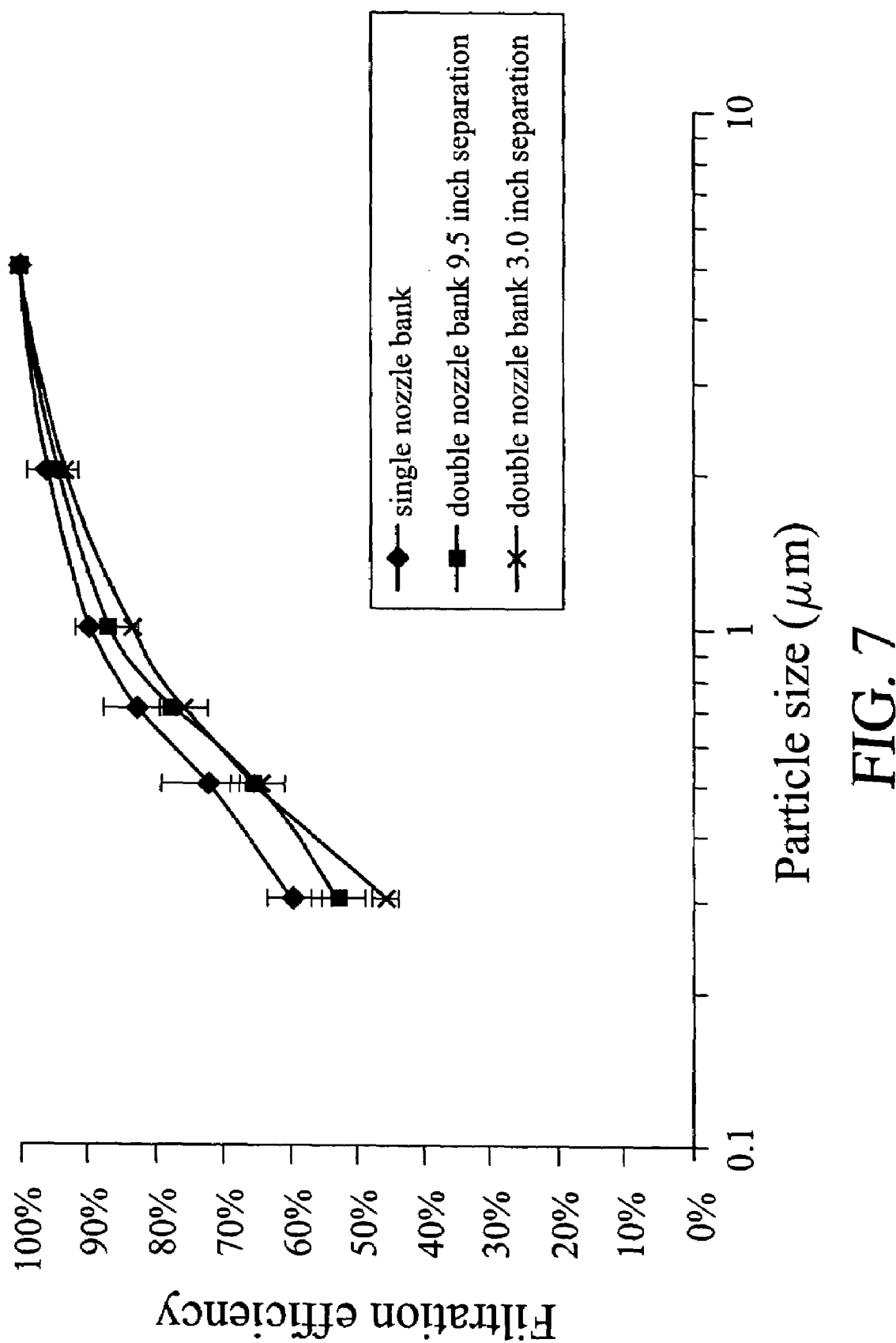
FIG. 7 is a graph of filtration efficiency of air filter media coated with nylon-6 fibers electrospun from a single or two electrospinning nozzle banks at the same weight coverage level, 0.1 g/m², showing effects of electrospinning nozzle spacing and shows results of Working Example II.

Effects of nozzle spacing on uniformity of spray pattern were determined. Results are shown in FIG. 7. As shown in FIG. 7, the filtration efficiency of air filter media coated with nylon-6 fibers electrospun from a two-bank nozzle set up was slightly lower than when only one nozzle bank was used; this may be due to increased instability of electrospinning coating by electric field interaction when more than one nozzle bank was used.

A summary of the data of Working Example II is set forth below.

Nylon-6 fibers with average diameters ranging from 120 to about 700 nm could be electrospun from nylon-6 solutions in 88% formic acid. The fiber size and size distribution was mainly affected by solution concentration. The initial fractional efficiencies of the air filter media were shown to be improved significantly by coating with nylon-6 fibers at weight coverage levels ranging from 0.03 to 0.5 g/m². The initial fractional efficiency increased with increasing coverage level and decreasing nylon fiber sizes at the same weight coverage level. On the other hand, the initial fractional efficiency was shown to be similar for air filter media coated with 120 nm and 300 nm nylon-6 fibers at a similar nylon-6 fiber length. Nylon-6 fibers were very durable on the air filter media at weight coverage level of 0.1 g/m² or lower due to the sufficient adhesion between the nylon-6 fibers and air filter media fibers.

The results also showed that the interactions between the similarly charged nylon solution jets during electrospinning affected the deposition of nylon fibers. At the same weight coverage level, the filtration efficiency of the air filter media coated with nylon-6 fibers electrospun using a single nozzle bank was slightly higher when compared with the case in which two nozzle banks were used.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. A composite comprising a cellulosic substrate comprising cellulosic fibers with a polyamide layer comprising polyamide fibers adhered thereto by an interrelation of fibers of the cellulosic substrate and fibers of the polyamide layer so that the cellulosic substrate and polyamide layer cannot be separated from each other by manually applied peeling forces(s) where the cellulosic substrate has a caliper ranging from 0.010 inch to 0.020 inch and the polyamide fibers have average fiber diameter ranging from 50 to 700 nm, a coverage level to average diameter ratio ranging from $2\times10^{-4}$ to $5\times10^{-3}$ gms/m²/nm and a ratio of total length of polyamide fibers to the surface area of the cellulosic substrate ranging from $1\times10^6$ to $1\times10^8$ km polyamide fiber/square meter of cellulosic substrate surface area.

2. The composite of claim 1 where the polyamide fibers have average diameter ranging from 100 nm to 400 nm.

3. A composite comprising a cellulosic substrate comprising cellulosic fibers with a polyamide layer comprising polyamide fibers adhered thereto by a interrelation of fibers of the cellulosic substrate and fibers of the polyamide layer so that the cellulosic substrate and polyamide layer cannot be separated from each other by manually applied peeling force(s), which constitutes a filter medium, said filter medium having an inlet side and an outlet side and comprising:

(a) a substrate layer on the outlet side of the filter medium, said substrate layer having an inlet side and an outlet side, said substrate layer comprising filter grade cellulose fibers, and having a caliper ranging from 0.010 inch to 0.020 inch, a basis weight ranging from 50 to 75 lbs/3000 ft², a Frazier permeability ranging from 12 to 20 CFM measured at 0.5 inch of water pressure drop and an initial fractional efficiency ranging from 5 to 15% for 0.3 µm particles;

(b) polyamide layer having an inlet side and an outlet side, comprising the polyamide fibers;

said filter medium providing a ratio of increase in percent fractional efficiency compared to that for substrate (a) to percent increase in pressure drop across said filter medium compared to that for substrate (a), ranging from 3 to 15.

4. The composite of claim 3 where the polyamide fibers have an average diameter ranging from 100 mm to 400 mm.

5. The composite of claim 3 where there is no cover layer on the inlet side of the polyamide layer.

\* \* \* \* \*